United States Patent [19]

Schmidt et al.

[11] 4,150,101
[45] Apr. 17, 1979

[54] PROCESS FOR THE PRODUCTION OF SILICA WITH AN AEROGEL TYPE STRUCTURE

[75] Inventors: Felix Schmidt, Hanau; Kurt Spitznagel, Freigericht; Adolf Wagner, Meerholz, all of Fed. Rep. of Germany

[73] Assignee: Deutsche Gold- und Silber-Scheideanstalt vormals Roessler, Frankfurt, Fed. Rep. of Germany

[21] Appl. No.: 558,445

[22] Filed: Mar. 14, 1975

[30] Foreign Application Priority Data

Mar. 26, 1974 [DE] Fed. Rep. of Germany ....... 2414478

[51] Int. Cl.² ............................................. C01B 33/16
[52] U.S. Cl. .................... 423/338; 252/317; 423/335
[58] Field of Search ................ 423/335, 338; 252/317; 106/288 B

[56] References Cited

U.S. PATENT DOCUMENTS

| 2,249,767 | 7/1937 | Kistler | 423/338 |
| 2,731,326 | 1/1956 | Alexander | 423/338 |
| 2,856,268 | 10/1958 | Young | 252/317 |
| 2,990,249 | 6/1961 | Wagner | 423/337 |
| 3,103,495 | 9/1963 | Wagner | 252/317 |
| 3,379,546 | 4/1968 | Debus | 106/193 |
| 3,393,155 | 7/1968 | Schutte | 252/316 |
| 3,455,717 | 7/1969 | Debus | 106/287 |
| 3,472,459 | 10/1969 | Pfeifer | 241/19 |
| 3,484,368 | 12/1969 | Klein | 208/251 |
| 3,580,844 | 5/1971 | Fratzscher | 210/40 |
| 3,632,352 | 1/1972 | Muller | 99/2 |
| 3,652,215 | 3/1972 | Aboutboul | 423/338 |

FOREIGN PATENT DOCUMENTS

| 790489 | 7/1968 | Canada | 423/335 |
| 1075573 | 2/1960 | Fed. Rep. of Germany. | |
| 2134510 | 8/1972 | France. | |
| 684016 | 12/1952 | United Kingdom. | |
| 1058618 | 2/1967 | United Kingdom. | |
| 1152051 | 5/1969 | United Kingdom. | |
| 1184094 | 3/1970 | United Kingdom | 423/335 |

Primary Examiner—L. Dewayne Rutledge
Assistant Examiner—Michael L. Lewis
Attorney, Agent, or Firm—Cushman, Darby & Cushman

[57] ABSTRACT

Aerogel like silica is prepared having:
 a BET surface area between 80–450 m²/g;
 a bulk density between 10–60 g/l;
 a DBP number between 2.4–3.8;
 an average particle size range of 0.1–7 μm;
 a most frequent particle size range of 1–2 μm;
 a pH value in a 4% aqueous suspension of 6–8.

The aerogel is produced by homogeneously distributing 5–50 weight % of water in air dispersed pyrogenic silica and drying the powdery mixture obtained. The products are especially useful as delustering agents.

28 Claims, 3 Drawing Figures

PROCESS FOR THE PRODUCTION OF SILICA WITH AN AEROGEL TYPE STRUCTURE

The invention is directed to a process for the production of a silica having an aerogel like structure.

By the term aerogel, silica gels are understood having low bulk densities (about 20 to 50 g/l) and high macroporosity (DBP numbers up to 3.4 ml/g, where DBP stands for dibutyl phthalate). Because of the contraction effect described by R. Iler which leads to a collapse of the pore structure in the drying of silica gels from the aqueous phase, silica aerogels are only accessible by the process described by Kistler in U.S. Pat. No. 2,249,767, the entire disclosure of which is hereby incorporated by reference and relied upon. For this purpose, Kistler partially dewaters silica sols with alcohol and then dries the water containing alcogels in an autoclave, by expanding under supercritical conditions. In this way, he obtains especially porous structures from the primary particles of the silica sol, which have high volume values in the region of macropores (>300Å) at very low apparent density (bulk density).

These materials designated as aerogels, according to their degree of porosity and bulk density serve as fillers, silica carriers, delustering agents, thickening agents, etc. The process for production of these aerogels is technically and economically very expensive because of the necessary addition of the organic solvent and the carrying out of the supercritical drying in the autoclave.

It has now been found that the described disadvantages of the previously available process for production of aerogels can be avoided if in place of particles of a silica sol one employs primary particles of a pyrogenically produced silica and one eliminates the step of recovery from the liquid phase.

The primary particles of pyrogenic silica are present in heaps loosely associated by electrostatic and van der Waal's forces. They form flocks which have a high air content and therefore have very high apparent pore volumes and corresponding low bulk density. A heap of these flocks is best designated as an air dispersion. The flocks are of course unstable and, in contrast to the secondary particles of the Kistler type aerogels, become broken down to primary particles at the slightest mechanical stress.

An object of the invention is to develop a process for the production of aerogel-like structured silica which is characterized in that there is worked into air dispersed pyrogenic silica 5–50 weight % of water with homogeneous distribution thereof and the powdery mixture obtained is dried. Since the volume of the silica is only decreased a trifling amount by the working in of the water, it is apparent that the originally present association of the primary particles of the air dispersed pyrogenic silica essentially remains intact.

Loading with water probably leads to a partial solution of silica from the surface of the silica particles so that dissolved silica is present here. This cements together the primary particles at their places of contact in the subsequent drying.

By controlled loading with water and subsequent drying, there is then formed from a pyrogenic silica a dispersion stable substance corresponding to the Kistler's aerogels with high macropore volume and very low apparent density (bulk density).

It has been further established that the structure present before the working in of the water apparently fixed by the packing density of the pyrogenic silica in air, which is manifest by its apparent density (bulk density), has a definite influence on the product obtained by the process of the invention: the more volumious the starting product, the more voluminous is the end product.

There have been found suitable for the production of the products of the invention pyrogenic silicas having a bulk density of 10 to 60 g/l, preferably 15 to 30 and especially about 20 g/l.

Furthermore, it has been found advantageous to choose pyrogenic silicas with large surface areas and small primary particle sizes. According to a preferred form of the process of the invention, there are used silicas with BET surface areas between 100 and 480 $m^2/g$, especially from 250 to 300 $m^2/g$.

A complete wetting of the primary particles can be produced by working in 5 to 20 weight %, especially 7 to 15 weight %, of water and homogeneously distributing this water in the silica. Since the water worked in is later removed by drying, for economical reasons there is sought to use the least possible amount of water. The necessary amount, however, a depends to a certain extent on the type of working in process.

The structure synthesized by the process of the invention can be noticeably improved if there is added to the water basic reacting compounds such as ammonia, sodium hydroxide, potassium hydroxide, water soluble amines, e.g. triethylamine, diethylamine, dibutylamine, ethanolamine, triethanolamine, etc., waterglass, etc. The basic material is suitably added in such amount that it establishes in the water a pH value of 7 to 14, preferably 8 to 12, especially 10 to 11.

The alkalis added act as solvent aids for silica and effect an increase in the macroporosity of the reaction product.

In place of alkaline compounds there can also be added to the water free silica or hydrolytic silica and/or substances which set free alkali. Free silica produced for example by acidification, e.g. with HCl or $H_2SO_4$, or ion exchange of alkali silicate solutions or by hydrolytic splitting of organic silicon compounds, for example tetramethyl silicate, likewise promotes the structural synthesis. A hydrolytic alkali and silica liberating substance is, for example, sodium methyl siliconate.

The homogeneous distribution of the water in the silica can be accomplished by dropping or spraying the water into the stirred silica at temperatures of the silica between 20° and 100° C., preferably 40° to 70° C., especially 50° to 60° C. The mixing motion suitably is accomplished by stirring.

A further variant in the introduction of water is spraying the water into a fluidized flowing mass of the silica, for example in a gravity pipe (fall tube).

Furthermore, it has been found advantageous to carry out the loading with water at moderately elevated temperature. This can be done if either the water to be worked in or the silica or both is preheated. Thus the water to be worked in can have a temperature between 20° and 100° C., preferably between 50° and 100° C., and especially 90° to 100° C.

The structural synthesis can also be promoted by steaming the laden silica for a short time in a closed space. The steaming leads to an especially good distribution of water. Thereby it has also been found favorable to steam the water-laden silica before the drying in a closed vessel for about 5 to 60 minutes, preferably 10 to 30 minutes, especially for about 20 minutes at temperatures up to the boiling point of the water, preferably 50° to 80° C., especially about 60° C.

A further possibility for improving the water distribution consists of grinding the water-laden silica for example in pinned disk mills or air jet mills.

It is then dried whereby probably the preformed structure is fixed by the primary particles having a partially dissolved particle surface or being coated with free silica.

The type of drying is of little criticality. The mixture of silica and water produced, which phenomenologically is always like a dry powder, can be dried for example in shelf driers, disk driers, tank driers, flow driers or microwave driers. The water-laden silica, however, can also be simultaneously ground and dried in a steam mill or air jet mill and thus eliminate the separate drying step.

So far as a separate drying of the powdery mixture obtained after loading with water is carried out, there can be added a dry grinding in a bar crusher or air jet mill.

A further object accomplished by the invention is the formation of an aerogel-like structured silica with following parameters for the material:
  BET surface area between 80–450 m$^2$/g;
  Bulk density between 10–60 g/l;
  DBP number between 2.4–3.8;
  Average particle size range of 0.1–7 μm;
  Most frequent particle size range of 1–2 μm;
  pH in 4% aqueous suspension of 6–8.

A further object of the invention is to produce the silica obtainable by the described process.

Finally the invention is concerned with the use of the described aerogel-like structured silica as a matting material.

The invention will be understood best in connection with the drawings wherein.

Unless otherwise indicated, all parts and percentages are by weight.

The invention is explained further by the following illustrative examples.

EXAMPLE 1

5 liters of pyrogenic silica having a bulk density of 25 g/l and BET surface area of 304 m$^2$/g were wet with 20 ml of water having a pH value of 6.8 in a Loedige mixer. The wetting took place at room temperature while mixing by stirring. The water was dropped in over 18 minutes from a burette.

There was obtained a dry acting (seeming) powder having a water content of 15.3 weight %. This powder was ground on an oppositely running bar crusher and dried in a laboratory drier at 120° C.

There was obtained a loose, opalescent powder having a bulk density of 17.8 g/l and a DBP number of 2.78 ml/g.

The effectiveness as a matting agent was tested in a polyurethane coating. The result is set forth in Example 9.

The product obtained as well as the starting material were suspended in water and dispersed ultrasonically. Each time a drop of this dispersion was dried on an objective stop. Electron microscope photographs of the samples show that the structured product of invention is present in the form of dispersion stable, discrete secondary particles in the predominant particle size range of between 1 and 10 μm. In contrast, the starting material was present practically completely in the form of primary particles.

The following should be noted in connection with both electron microscopic photographs.

Figure 1:
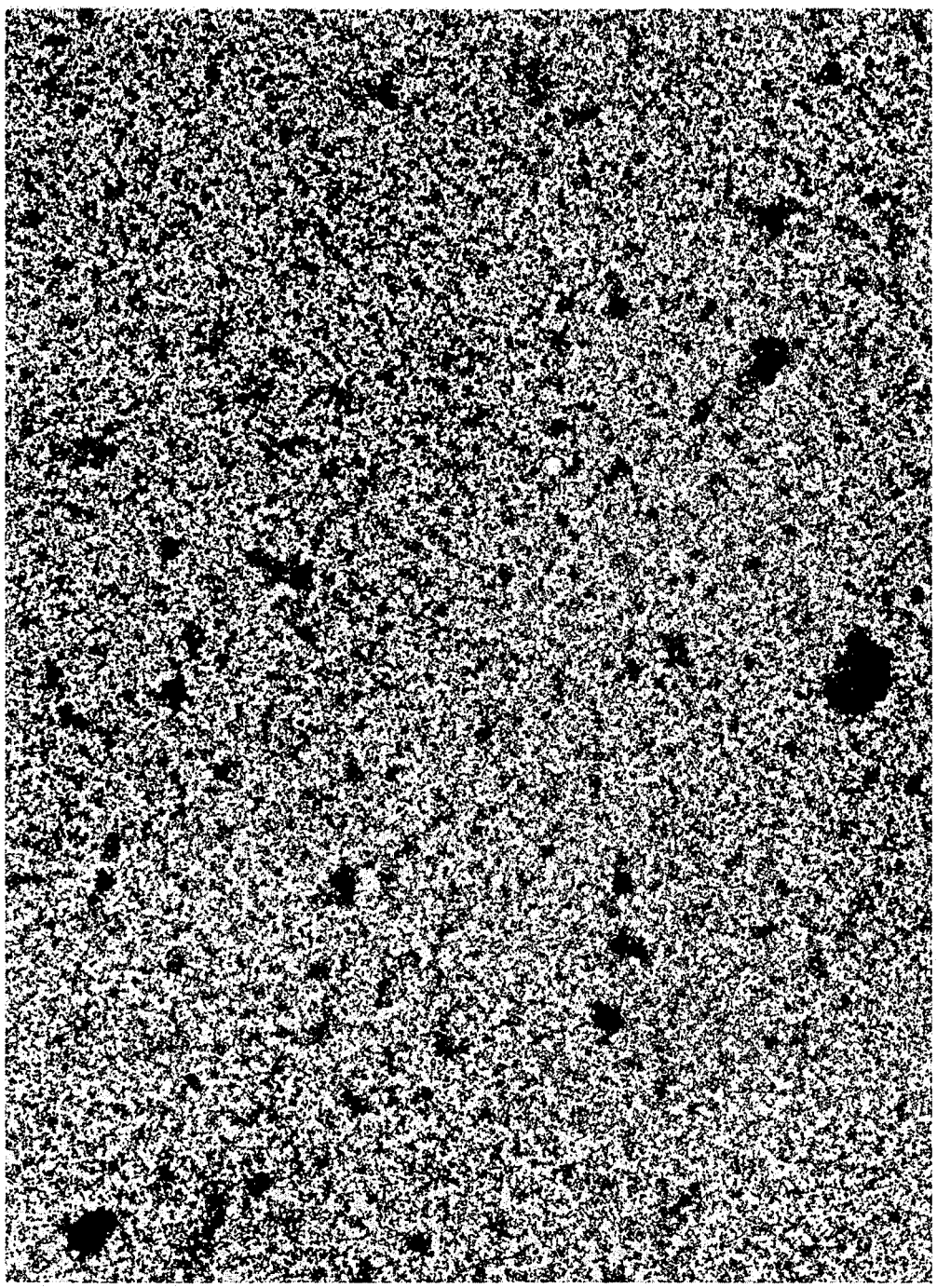
FIG. 1 is an electron microscopic photomicrograph of the starting material in Example 1.

FIG. 1 shows in a magnification of 5,000 times the starting material of Example 1 which is dispersed ultrasonically in water and dried. The primary particles are present largely as discrete particles.

Figure 2:
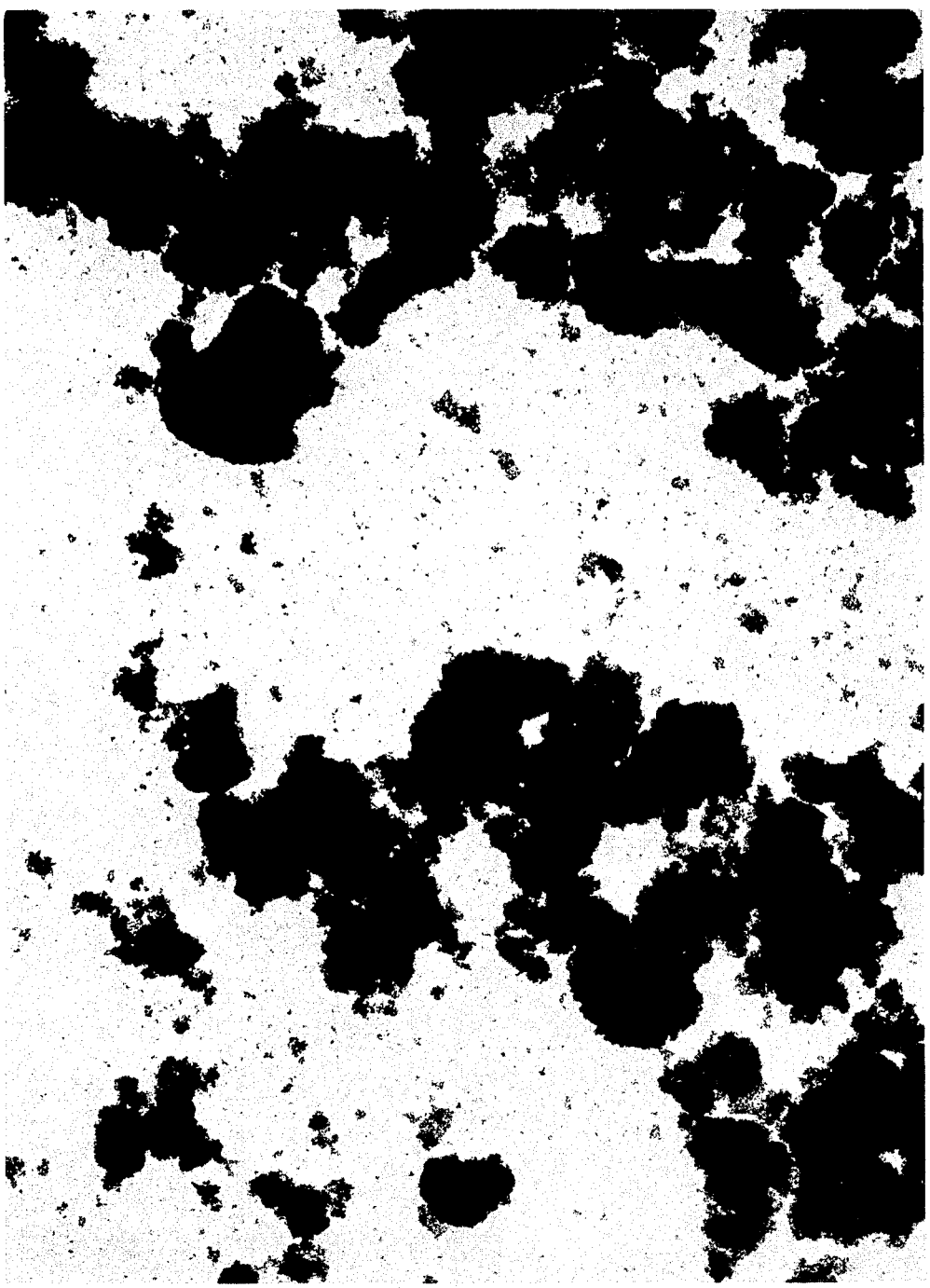
FIG. 2 is an electron microscopic photomicrograph of the final product of Example 1.

FIG. 2 also in a magnification of 5,000 times shows the final product of Example 1 which is dispersed ultrasonically in water and dried. The formation of a secondary structure is clearly recognizable.

EXAMPLE 2

5 liters of a pyrogenic silica having a bulk density of 19.3 g/l and a BET surface area of 189 m$^2$/g were wetted in a Loedige mixer with 20 ml of water which was adjusted to a pH of 11.3 with sodium hydroxide.

The wetting took place at room temperature with mixing by stirring in a time of 20 minutes. The addition of water was carried out dropwise from a burette.

There was obtained a dry acting powder having a water content of 16%.

Since the powder contains perceptible solid constituents which obviously were traced back to the collapse of the apparent structure of the pyrogenic silica by local excess of water, the powder was ground on a bar crusher and dried in a laboratory drier at 120° C.

There was obtained a loose, opalescent powder with a bulk density of 17.5 g/l, a BET surface area of 153 m$^2$/g, a DBP number of 2.6 ml/g, a water pore volume according to Innes of 1.9 ml/g and a residual water content of 2.6%.

The matting effect of the product was tested in a polyurethane coating and is set forth in Example 9.

EXAMPLE 3

There were fed into a dropping tube (fall tube) by way of a proportioning screw pyrogenic silica with a bulk density of 27 g/l and a BET surface area of 297 m$^2$/g.

There was introduced by a nozzle into the flowing mass in the dropping tube per 10 parts silica 1.5 parts of ammoniacal water having a pH of 10.1. There was obtained a dry acting powder having a bulk density of 26 g/l and a water content of 12 weight %.

This powder was dried in a microwave oven.

There was obtained an opalescent loose powder having a bulk weight of 23 g/l, a BET surface area of 270 m$^2$/g and a DBP number of 3.1 ml/g.

The matting effect of the product was tested in a polyurethane coating and is set forth in Example 9.

EXAMPLE 4

Water-laden product from Example 3 was ground in an air jet mill of the firm Jet-O-mizer, Type A 0202 at 3.1 atmospheres absolute grinding pressure, 3.2 atmospheres absolute injector pressure and an addition rate of 8.8 kg per hour in order to improve the water distribution.

The drying to a 3.2 weight % of residual water took place in a laboratory drier at 120° C.

There was obtained a loose, opalescent powder with a bulk density of 14 g/l, a BET surface area of 277 m$^2$/g, a DBP number of 3.6 ml/g and a water pore volume according to Innes of 2.4 ml/g.

The matting effective of the substance was tested in a polyurethane coating and is set forth in Example 9.

EXAMPLE 5

The product of Example 3 laden with 12 weight % water was ground on an oppositely running bar crusher and steamed in a closed, preheated powder flask for 20 minutes at 55° C. and finally dried at 120° C. in a laboratory drier to a residual moisture of 3 weight %.

There was obtained a loose, opalescent powder having a bulk density of 16 g/l, a BET surface area of 264 m$^2$/g, a DBP number of 3.78 ml/g and a water pore volume according to Innes of 2.4 ml/g.

The matting effect of the product was tested in a polyurethane coating and is set forth in Example 9.

EXAMPLE 6

There were fed by way of a proportioning screw to a dropping tube heated to 70° C. pyrogenic silica having a bulk density of 54 g/l and a BET surface area of 311 m$^2$/g. Into this fluidized flowing mass there were introduced by way of a nozzle per 10 parts of silica 3 parts of 80° C. warm water that was adjusted to a pH of 10.4 with waterglass (sodium silicate).

There was obtained an apparently dry powder with a bulk density of 80 g/l and a water content of 18.3 weight %. This powder was ground in the air jet mill set forth in Example 4 and under the conditions set forth in that example and subsequently dried in a disk drier with a disk temperature of 127° C. to a residual water content of 4.2%.

There was obtained an opalescent, loose powder having a bulk density of 36 g/l, a BET surface area of 260 m$^2$/g and a DBP number of 3.2 ml/g.

The matting effect of the product was tested in a polyurethane coating and is reported in Example 9.

EXAMPLE 7

The dry product of Example 5 was ground again on a bar crusher.

There was obtained a loose powder with a bulk density of 13 g/l and a DBP number of 3.2 ml/g.

The matting effect of the product was tested in a polyurethane coating and is set forth in Example 9.

EXAMPLE 8

The matting effect of the products obtained in Examples 5 and 7 was compared in a black baking enamel with the commercial aerogel produced according to the Kistler process. There was judged the degree of luster (gloss) according to Lange at a reflection angle of 45° and the Grindometer value according to Hegemann.

The following values were obtained:

| Product | Grindometer value in | % Residual luster |
| --- | --- | --- |
| Commercial aerogel | 62 | 4.0 |
| Product of Example 5 | 38 | 0.2 |
| Product of Example 7 | 30 | 3.7 |

The enamel used had the following composition:

| Carbon black paste Tak 1 | 7 parts by weight |
| --- | --- |

-continued

| Algital 64 75% in xylene | 53 parts |
| --- | --- |
| Matrenal NP 55% in butanol | 12 parts |
| butanol | 4 parts |
| ethylene glycol | 2 parts |
| xylene | 16 parts |
| butyl glycolate | 2 parts |
| 85% butyl acetate | 2 parts |
| Silicone oil 10% in xylene | 2 parts |

In each case 5 parts by weight of the product was worked into the enamel. The working in took place by 10 minutes stirring with a bladed stirrer at 2000 rpm The lacquer was sprayed on sheet iron at a thickness of about 30 μm, air dried and baked at 180° C. for 30 minutes.

EXAMPLE 9

Figure 3:
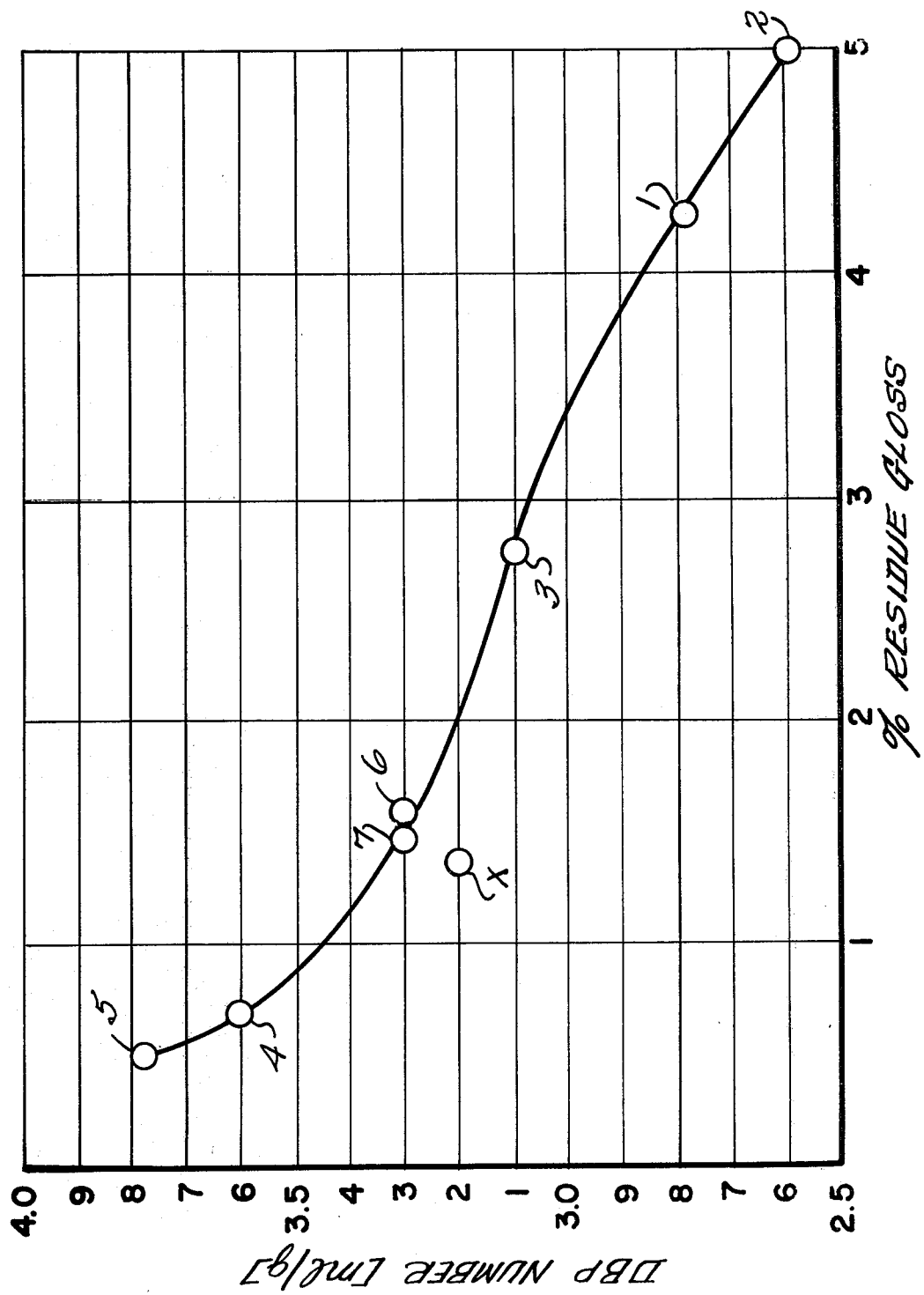
FIG. 3 is a graph of DBP number vs. % residual luster.

The matting effect of the products obtained in Examples 1-7 were tested in a polyurethane coating which is very hard to flat with the usual matting agents and which is therefore usually preferably matted with aerogels. There was also tested in the same polyurethane coating a commercial matting agent (made according to Kistler). Surprisingly as is shown in the following table and in the graph of FIG. 3 a correlation could be demonstrated between the porosity expressed by the DBP number and the degree of matting produced. The degree of matting was measured according to Lange at a reflection angle of 60° (FIG. 3).

| Product | % Residual Luster 60° | DBP-Number (ml/g) |
| --- | --- | --- |
| Starting material of Example 1 | 15.0 | — |
| From Example 1 | 4.3 | 2.78 |
| From Example 2 | 5.0 | 2.60 |
| From Example 3 | 2.8 | 3.10 |
| From Example 4 | 0.7 | 3.60 |
| From Example 5 | 0.5 | 3.78 |
| From Example 6 | 1.6 | 3.20 |
| From Example 7 | 1.4 | 3.20 |
| Commercial Product | 1.5 | 3.30 |

The coating material had the following composition:

| Mikrolith ® black | 3.01 parts by weight |
| --- | --- |
| Mikrolith ® blue | 0.62 parts |
| 30% Impranil ® CHW (polyurethane) in ethyl acetate | 84.0 parts |
| Ethyl acetate | 10-20 parts |

There were worked into this material with a spatula 3.62 parts by weight of the product being tested and the mixture subsequently dispersed for 4 minutes with a Dissolver at 2000 rpm.

After this there was stirred into each composition with a spatula 4.22 parts by weight of Imprafix ® and Desmodur ® L (triphenyl methane triisocyanate) and with a 300 μm die plate attached to cartons.

After the coating was air dried it was hardened for 30 minutes at 80° C. in a drier.

The process can comprise, consist essentially of or consist of the steps disclosed.

What is claimed is:

1. A process for the production of an aerogel-like structured silica comprising uniformly working 5 to 50 weight % of water into an air dispersed pyrogenic silica and drying the powdery mixture produced.

2. The process of claim 1 wherein there is employed silica having a bulk density of 10–60 g/l.

3. The process of claim 2 wherein the bulk density is 15–30 g/l.

4. The process of claim 3 wherein the bulk density is about 20 g/l.

5. The process of claim 2 wherein the silica employed has a BET surface area between 100 and 480 m²/g.

6. The process of claim 5 wherein the silica employed has a BET surface area between 250 and 300 m²/g and a bulk density of 15–30 g/l.

7. The process of claim 6 wherein there is worked in 7 to 15 weight % of water.

8. The process of claim 2 wherein there is worked in 5 to 20 weight % of water.

9. The process of claim 2 wherein the water contains a basic compound.

10. The process of claim 9 wherein the basic compound is ammonia, sodium hydroxide, potassium hydroxide, a water soluble amine or waterglass.

11. The process of claim 9 wherein the water has a pH of 7–14.

12. The process of claim 11 wherein the water has a pH of 8–12.

13. The process of claim 12 wherein the water has a pH of 10–11.

14. The process of claim 2 comprising obtaining uniform distribution of the water in the silica by injecting the water into agitated silica at a silica temperature of 20° to 100° C.

15. The process of claim 14 wherein the temperature is 40° to 70° C.

16. The process of claim 15 wherein the temperature is 50°–60° C.

17. The process of claim 14 comprising spraying the water into a fluidized flowing mass of the silica.

18. The process of claim 2 wherein the water which is worked in has a temperature between 20° and 100° C.

19. The process of claim 18 wherein the water which is worked in has a temperature of 50°–100° C.

20. The process of claim 18 wherein the water which is worked in has a temperature of 9°–100° C.

21. The process of claim 18 wherein the water laden silica is steamed before drying in a closed vessel for 5 to 60 minutes at a temperature up to the boiling point of water.

22. The process of claim 21 wherein the steaming is at a temperature of 50°–80° C.

23. The process of claim 22 wherein the steaming is carried out for 10–30 minutes.

24. The process of claim 23 wherein the steaming is carried out at about 60° C. for about 20 minutes.

25. The process of claim 2 wherein the water laden silica is ground.

26. The process of claim 25 comprising after the grinding step drying the water laden silica.

27. The process of claim 25 comprising simultaneously grinding and drying the water laden silica.

28. The process of claim 2 wherein there is added free silica produced by acidification or ion exchange of alkali silicate solution or the hydrolytic splitting of tetramethyl silicate or sodium methyl siliconate.

* * * * *